United States Patent
Bunge et al.

(10) Patent No.: US 8,582,979 B2
(45) Date of Patent: Nov. 12, 2013

(54) METHOD AND ARRANGEMENT FOR TRANSMITTING AN OPTICAL OFDM-SIGNAL

(75) Inventors: Christian Alexander Bunge, Berlin (DE); Matthias Schuster, Mering (DE); Bernhard Spinnler, Oberhaching (DE)

(73) Assignee: Nokia Siemens Networks OY, Espoo (FI)

( * ) Notice: Subject to any disclaimer, the term of this patent is extended or adjusted under 35 U.S.C. 154(b) by 977 days.

(21) Appl. No.: 12/193,459

(22) Filed: Aug. 18, 2008

(65) Prior Publication Data
US 2009/0067833 A1 Mar. 12, 2009

(30) Foreign Application Priority Data
Aug. 17, 2007 (EP) .................................... 07016216

(51) Int. Cl.
*H04B 10/04* (2011.01)
*H04B 10/12* (2011.01)
*H04B 10/06* (2011.01)

(52) U.S. Cl.
USPC ........... 398/183; 398/159; 398/182; 398/184; 398/185; 398/186; 398/187; 398/202; 398/203; 398/204; 398/205; 398/206; 398/207

(58) Field of Classification Search
None
See application file for complete search history.

(56) References Cited

U.S. PATENT DOCUMENTS

| | | | |
|---|---|---|---|
| 3,937,945 A * | 2/1976 | Fitzmaurice et al. | 703/3 |
| 6,775,631 B2 * | 8/2004 | Van Schyndel | 702/85 |
| 2003/0138181 A1 * | 7/2003 | Davies | 385/3 |

FOREIGN PATENT DOCUMENTS

| WO | WO-03/052977 A | 6/2003 |
|---|---|---|
| WO | WO-2007/064165 A | 6/2007 |

OTHER PUBLICATIONS

Lowery Arthur James et al: "Orthogonal frequency division multiplexing for adaptive dispersion compensation in long haul WDM systems" Optical Fiber Communication Conference, 2006 and the 2006 National Fiber Optic Engineers Conference, IEEE, PI, Mar. 5, 2006, pp. 2753-2755, XP009095841 ISBN: 1-55752-803-9.

Ketteol F: "SSB signals and the problem of SSB modulation when the information is contained in the envelope" Instruments and Experimental Techniques, Consulants Bureau. New York, US, vol. 37, Nov. 1964, pp. 247-259, XP009095894 ISSN: 0020-4412.

Kettel, "Einseitenbandsignale and das Problem einer Einseitenbandmodulation, bei der die Nachricht in der Enveloppe liegt", [SSB signals and the problem of SSB modulation when the information is contained in the envelope], Instruments and Experimental Techniques, Consultant Bureau, NewYork, U.S., vol. 37, Nov. 1964, pp. 247-259, XP 009095894, ISSN:0020-4412—Statement of Relevance.

* cited by examiner

*Primary Examiner* — Ken Vanderpuye
*Assistant Examiner* — Darren E Wolf
(74) *Attorney, Agent, or Firm* — Laurence A. Greenberg; Werner H. Stemer; Ralph E. Locher (57) ABSTRACT

From an real valued OFDM signal ($S_0(t)$) is a baseband signal ($S_B(t)$) derived and converted into a complex single sideband modulation signal ($n(t)$). This is modulated onto an optical carrier ($f_{OC}$) to generate a SSB transmission signal ($S_{OT}$) having a small bandwidth an carrying the information in the envelope or in the power of the envelope. According to the modulation direct detection is possible. Only a small bandwidth is necessary for the transmission.

13 Claims, 5 Drawing Sheets

OffsetSSB

FIG. 2B
CompSSB

METHOD AND ARRANGEMENT FOR TRANSMITTING AN OPTICAL OFDM-SIGNAL

CROSS REFERENCE TO RELATED APPLICATIONS

This application is a non-provisional application, which claims the benefit of priority to European application no. 07016216, filed Aug. 17, 2007, the contents of which hereby incorporated by reference.

BACKGROUND OF THE INVENTION

The invention refers to a method and an apparatus for transmitting an optical orthogonal frequency division multiplex signal.

Orthogonal frequency division multiplexing is a promising modulation technique, which enables to overcome chromatic dispersion in optical transmission systems. OFDM is well known from wireless and wired communications. A plurality of binary information symbols, interpreted as weights of consecutive orthogonal subcarriers, called channels here, are translated from the frequency domain into the time domain via an Inverse Fast Fourier Transform (IFFT) and transmitted via an optical fiber as a block. The next combination of binary information symbols is transmitted in the next block. At the receiver these blocks are translated back to the frequency domain using a Fast Fourier Transform (FFT) and then demodulated.

Chromatic dispersion of optical fibers is a problem for most optical transmission systems. Chromatic dispersion results in different time delays for different frequencies. To overcome chromatic dispersion, it is important to avoid the generation of two side bands, when modulating the OFDM signal onto an optical carrier. Therefore, single-sideband (SSB) modulation has to be applied. The theory of single-sideband modulation for audio signals was described by E. Kettel, Telefunken-Zeitung, Jg. 37 Heft 3/4, especially pages 247-251. The big advantage of "Compatible" SSB-modulation is the highly spectrally efficient signal capable for direct detection. To receive OFDM signals, in general a coherent receiver is required. However, special signal designs also allow the much simpler and thus cheaper direct detection.

Figure 2A:
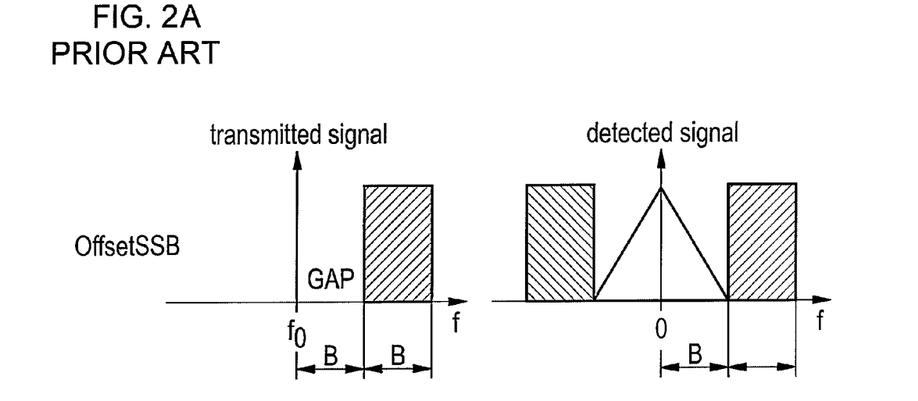
FIGS. 2A and 2B show spectra of a prior art "Offset SSB OFDM" system and the inventive "Compatible OFDM SSB" system, respectively.
Figure 2B:
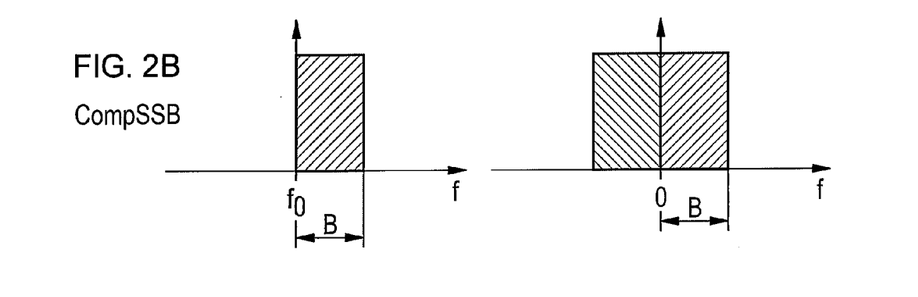
Figure 3:
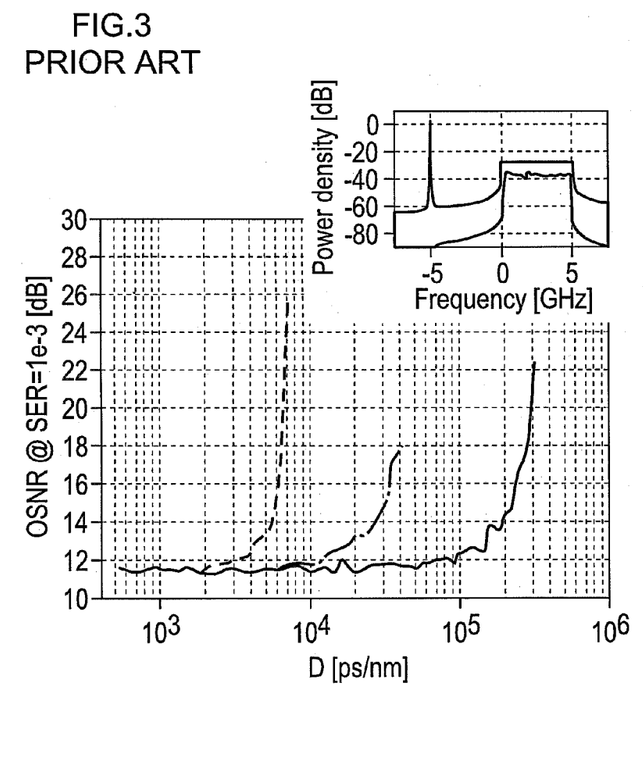
FIGS. 3 and 3B show the performance of both systems in two diagrams and in insets of the diagrams a real spectrum of the Offset OFDM SSB OFDM system and a spectrum of the Compatible OFDM SSB OFDM system according to the invention and, FIG. 4 shows a improved second embodiment of the Compatible SSB OFDM transmission system.

One possibility for direct detection, as suggested by Lowery et al, Proceedings of Optical Fiber Communications, OFC 2006, PDP39, pp. 247-259, is to have a gap between carrier and signal with the same width as the OFDM signal itself (see FIG. 2 or inset FIG. 3). This method is named "Offset SSB". After the photodiode, according to the squaring of the received optical OFDM signal while converting it into an electrical signal, the signal-signal beat product falls into this region, whereas the useful signal (the signal-carrier beat terms) is found adjacent to the gap interval. The drawback of this approach is the large amount of bandwidth occupied by the gap-interval, which implies low spectral efficiency. This method also requires additional modulation onto a radio frequency subcarrier and additional components.

OBJECTS AND SUMMARY OF THE INVENTION

It is an object of the invention to overcome these problems and to find a method and an apparatus for high quality transmission of OFDM signals without a large amount of bandwidth.

A way to overcome these problems can be achieved by Compatible SSB-modulation for direct detection without wasting bandwidth for a gap interval. This can be achieved by carrying the information in the envelope or, in the context of a squaring receiver, in the power of the envelope. The relative power of the carrier depends on the crest factor (peak/mean power) of the signal. As the crest factor for OFDM signals is usually rather high, which implies a large carrier power, this gives rise also to a large required optical signal-to-noise ratio (OSNR). A main advantage of the OFDM method is that chromatic dispersion does not influence the orthogonality of the carriers. Of course, it is also possible to compensate chromatic dispersion when SSB modulation is used.

To achieve an appropriate transmission signal the following steps are necessary:
Generating a real OFDM baseband signal having limited values, converting the OFDM baseband signal into a complex modulation signal,
modulating the amplitude and the phase of an optical carrier with a modulation signal generating an optical transmission signal carrying information of the modified OFDM baseband signal in the amplitude of its envelope are.

The received transmission signal can be direct demodulated by a photo diode without distortion from convolution products.

The method can be improved by generating a modified real OFDM baseband signal having limited values,
converting the modified OFDM baseband signal into a complex modulation signal,
modulating the amplitude and the phase of an optical carrier with the modified modulation signal generating an modified optical transmission signal ($S_{OTC}(t)$) carrying information of the modified baseband signal in the power of its envelope.

Applying this method, the calculation of the square root of the OFDM signal is not necessary at the transmitter side. Square root processing is executed by the receiver. The result is a huge improvement in performance.

For of system design reasons it is advantageously to apply digital signal processing to generate single sideband modulation signals.

Applying the first method, a modulation signal is generated $n(t)=S_B(t)e^{j\phi(t)}$, which is calculated according to $S_B(t)=\sqrt{S_1(t)}$ and $\phi(t)=H\{\ln S_B(t)\}$, with $S_1(t)=$a limited OFDM signal, $\phi(t)=$a phase modulation term.

Applying the improved method, it is advantageously to generate a modified single sideband modulation signal $n_C(t)=S_{BC}(t)e^{j\phi_C(t)}$, which is calculated according to $S_{BC}(t)=S_{1C}(t)$ ˆ $\phi_C(t)=H\{\ln (S_{BC}(t))\}$, with $S_{1C}(t)=$a limited OFDM signal,
$\phi_C(t)=$a modified phase modulation term.

According to both modulation methods, it is feasible at the receiver to apply direct detection to a received transmission signal.

Utilizing the improved method, it is necessary to apply square root processing at the receiver to a detected signal.

Digital processing is advantageously at the transmitter and at the receiver because al function and signals can be easier generated than with analogue elements.

BRIEF DESCRIPTION OF THE DRAWINGS

Examples of the invention including a preferred embodiment are described below with reference to accompanying drawings and accompanying figures, where.

DETAILED DESCRIPTION OF THE INVENTION

Figure 1:
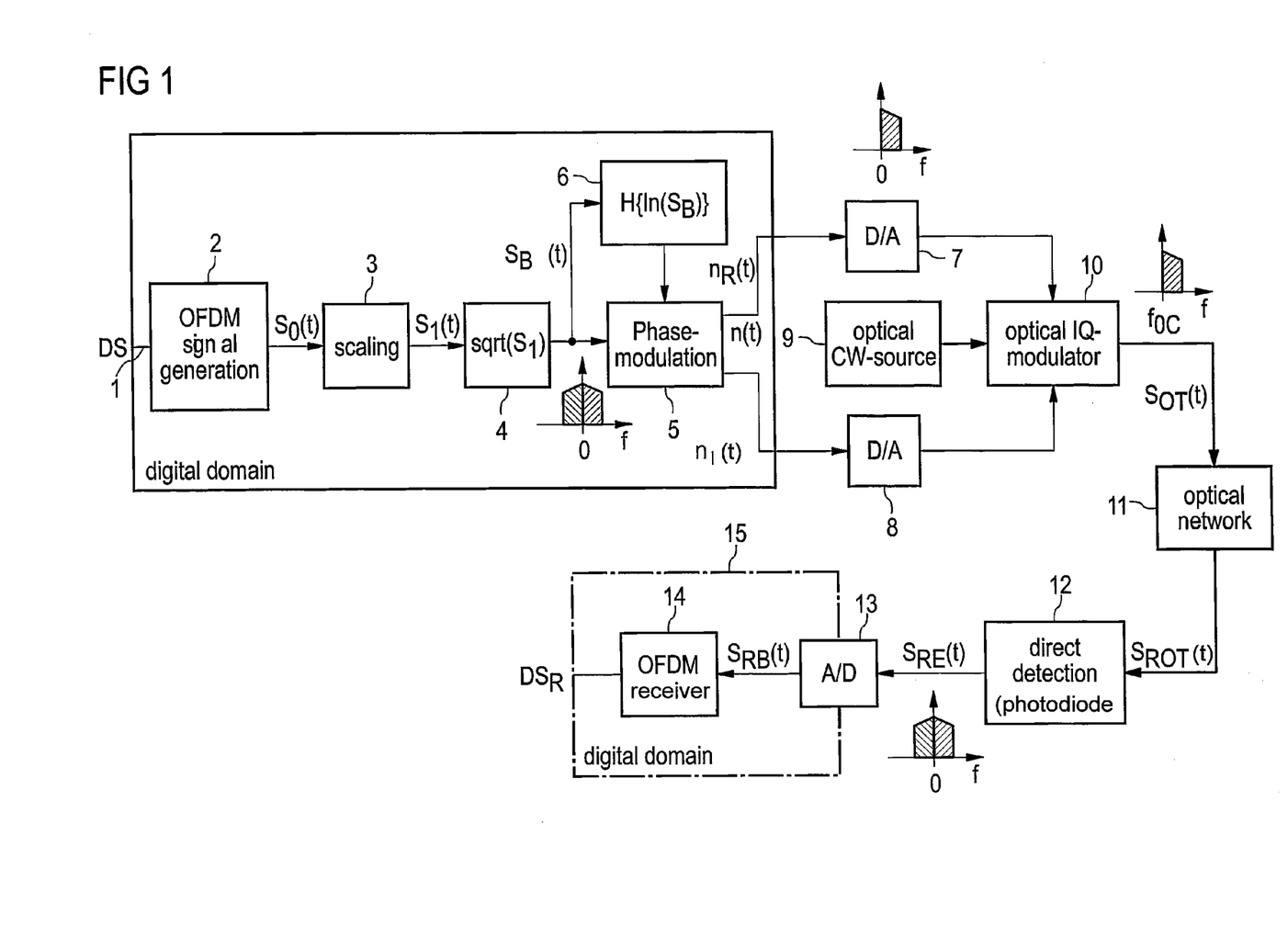
FIG. 1 shows a schematic drawing of an OFDM transmitter and an OFDM receiver.

FIG. 1 illustrates a first embodiment of an OFDM transmission system with an OFDM transmitter 1-10 and an OFDM receiver 12-15. Only essential parts are illustrated, filters etc. are not shown. The illustrated units in the digital domains are functional blocks, e.g. realised in a first digital processor (2-6) and a second digital processor 14.

At least one data signal DS is fed to an input terminal 1 of an OFDM signal generator 2 of the OFDM transmitter 1-10. The data signal DS is converted into parallel signals, which are associated with a plurality of subchannels. Each subchannel is characterized by an orthogonal subcarrier frequency. The signals are fed to an OFDM signal generator 2 of the transmitter. The OFDM signal generator 2 modulates the signals onto the orthogonal subcarrier frequency signals. E.g. intensity modulation, four phase modulation, differential phase modulation or a combination of phase an intensity modulation could be applied.

The modulated signals of the subchannels are converted from the frequency domain into an real valued OFDM signal $S_0(t)$ in the time domain by an Inverse Fast Fourier Transformation. The modulation and the transformation are done by digital data processing (an analogue OFDM signal could be achieved by adding modulated analogue carrier signals). The generation of OFDM signals is familiar to those skilled in the art.

A scaling unit 3 is connected in series with OFDM signal generator 2 and converts the values (amplitude) of the OFDM signal $S_0(t)$ into a limited OFDM signal $S_1(t)$ containing only positive values in a predetermined range, e.g. the values of $S_1(t)$ are limited in a first step to the range of ±1 and than a 1 is added to achieve only positive values. The calculation is executed for every block. The maximum value $\max(|S_0(t)|)$ could be constant for a plurality of blocks.

$$S_1(t)=1+S_0(t)/\max(|S_0(t)|) \quad (1)$$

To compensate the squaring effect of a photodiode in the receiver, an OFDM baseband signal $S_B(t)$ is generated by a root processor 4 applying a square root to $S_1(t)$ to generate an OFDM baseband signal $$S_B(t)=\sqrt{S_1(t)}=\sqrt{1+S_0(t)/\max(|S_0(t)|)} \quad (2)$$

This OFDM baseband signal is fed to a phase modulator 5 and a Hilbert transformer 6 to generate a complex modulation signal.

In general, according to Kettel, an ideal SSB signal m(t) of an arbitrary real signal σ(t) is given by $$m(t)=\sigma(t)+jH\{\sigma(t)\}, \quad (3)$$

$H\{\sigma(t)\}$ is the Hilbert transform of σ(t). Based on that definition, we define a modulation signal n(t) (the modulation signal modulates the optical carrier):

$$n(t)=e^{m(t)}=S_B(t)e^{j\phi(t)} \quad (4)$$

which is still a SSB signal, whose amplitude $S_B(t)$ and phase φ(t) are interdependent via equation (3). The amplitude $S_B(t)$ is defined in equation (2). According to Eq. 3 and 4, the additional phase modulation term φ(t), which is required to obtain a SSB signal, becomes $$\phi(t)=H\{\ln(\sqrt{1+S_0(t)/\max(|S_0(t)|)})\}=H\{\ln S_B(t)\} \quad (5)$$

This phase modulation signal φ(t) is derived from the OFDM baseband signal $S_B(t)$ by equation (4), which calculates the Hilbert-transform of the natural logarithm. To avoid aliasing, oversampling should be used in this part of the signal processing.

The other sideband can be generated if $m_2(t)=\sigma(t)-jH\{\sigma(t)\}$ or $n_2(t)=S_B(t)e^{-j\phi(t)}$ is applied, only one sideband signal is considered below.

The phase-modulator 5 applies phase modulation to the baseband signal $S_B(t)$ combining the modulation terms $S_B(t)$ and φ(t) according to equation (4), and outputs as a result the complex single sideband modulation signal n(t).

To modulate the SSB modulation signal n(t) onto an optical carrier $f_{OC}$, an optical IQ-modulator 10 (In-phase, Quadrature component) is used, which generates an optical field $$E(t)=n(t)\cdot\exp(j2\pi f_{OC}t) \quad (6).$$

The digital modulation signal n(t) is split into a real component $n_R(t)$ and an imaginary component $n_I(t)$. These digital modulation components are converted by digital-analogue converters 7 and 8 into analogue modulation signals and fed to the optical IQ-modulator 10. The optical carrier $f_{OC}$ is generated by an optical source (laser) 9 and also fed to the optical IQ-modulator. The IQ-modulator 10 has a double parallel Mach-Zehner structure and is capable to generate an optical single sideband transmission signal $S_{OT}(t)$, which amplitude and phase is modulated.

Figure 3B:
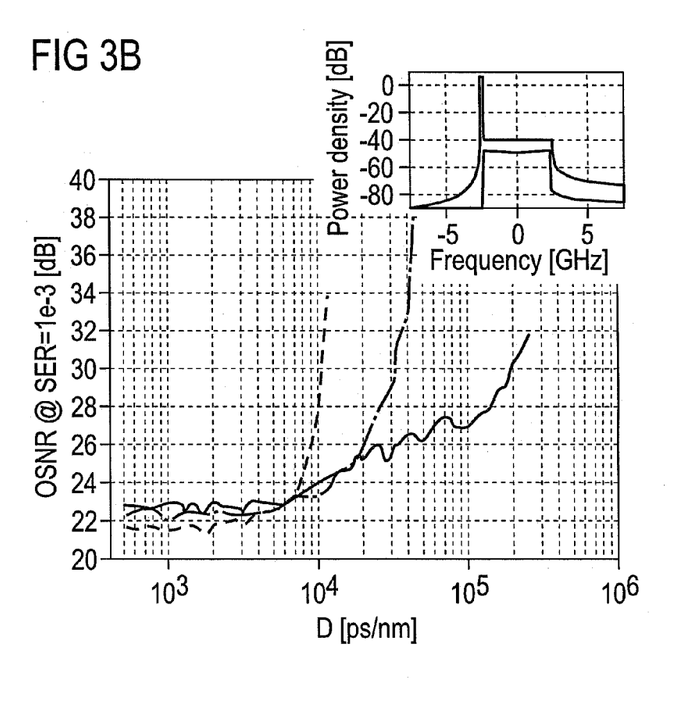

The transmission signal $S_{OT}(t)$ contains the optical carrier $f_{OC}$ and the baseband signal $S_B(t)$, whose spectrum is positioned adjacent to the optical carrier $f_{OC}$. The spectrum of the transmission signal $S_{OT}(t)$ is shown in the inset of FIG. 3b.

According to equations (2) and (4) the information of the OFDM baseband signal is carried in the power of the envelope of the transmission signal $S_{OT}(t)$, which corresponds to the squared amplitude of the envelope.

The transmission signal $S_{OT}(t)$ is transmitted over an optical network 11 (fiber) to the receiver 12-15. The receiver comprises an optical-electrical converter 12, an analogue-digital converter 13, and an OFDM receiver 14 connected in series.

A received transmission signal $S_{ROT}(t)$ is converted into an electrical "detected" signal $S_{RE}(t)$ by a photo diode 12 or a photo transistor. The optical-electrical conversion results in a photo current proportional to the power of the received optical signal, the amplitude of the received optical signal is squared and the information is recovered by so called direct detection. Squaring of a time signal corresponds to a convolution of the signal spectrum with itself in the frequency domain. Therefore, the spectrum of the received optical signal $S_{ROT}(t)$ is convolved with itself and translated into a "received baseband signal" $S_{RB}(t)$ in the electrical baseband domain.

FIG. 2A shows a spectrum of the "OffsetSSB OFDM" signal as suggested by Lowery. The transmission signal has a spectral gap GAP between the carrier $f_{OC}$ and a spectrum of the baseband signal with bandwidth B. The gap GAP has the same frequency width as the spectrum of the baseband signal (or the modulation signal respectively). Therefore, after the photodiode all the distorting beat products, caused by optical-electrical conversion, fall into the gap GAP.

When compatible SSB "CompSSB" according to our invention is used, there is no real gap between the carrier and the spectrum of the transmitted baseband signal n(t) as is illustrated in FIG. 2B. According to the Compatible SSB modulation there are only minor distorting beat products generated and only half of the bandwidth is needed to transmit the OFDM signal.

The detected electrical signal $S_{RE}(t)$ is converted into a digital baseband signal $S_{RB}(t)$ by the analogue-digital converter 13 and digitally processed in the OFDM receiver 14 performing a "Fast Fourier Transformation" translating back the OFDM baseband signal $S_{RB}(t)$ into the received data signal $DS_R$, which is output at output-terminal 15.

FIGS. 3 and 3B show in the insets the real spectra of optical transmission signals for equal total signal power (including the carrier) and illustrates in the diagrams the performance of the prior art Offset SSB OFDM system and the new Compatible SSB OFDM system. The diagrams 3 and 3b illustrate the required optical signal to noise ratio OSNR at a symbol error rate SER=$10^{-3}$ as a function of the dispersion D [ps/nm] in picoseconds per nanometer when QPSK modulation (quadrature phase shift keying) is applied for transmission of about 10 Gb/s in 10 GHz and 5 GHz bandwidth channels, respectively. Results are shown for 15 (dashed line), 127 (dash-dotted) and 1023 (solid) OFDM channels.

According to FIG. 3b a higher optical signal noise ratio is necessary for a system using Compatible SSB modulation to reach the same error rate as the Offset SSB system, but the bandwidth is reduced to a half.

Figure 4:
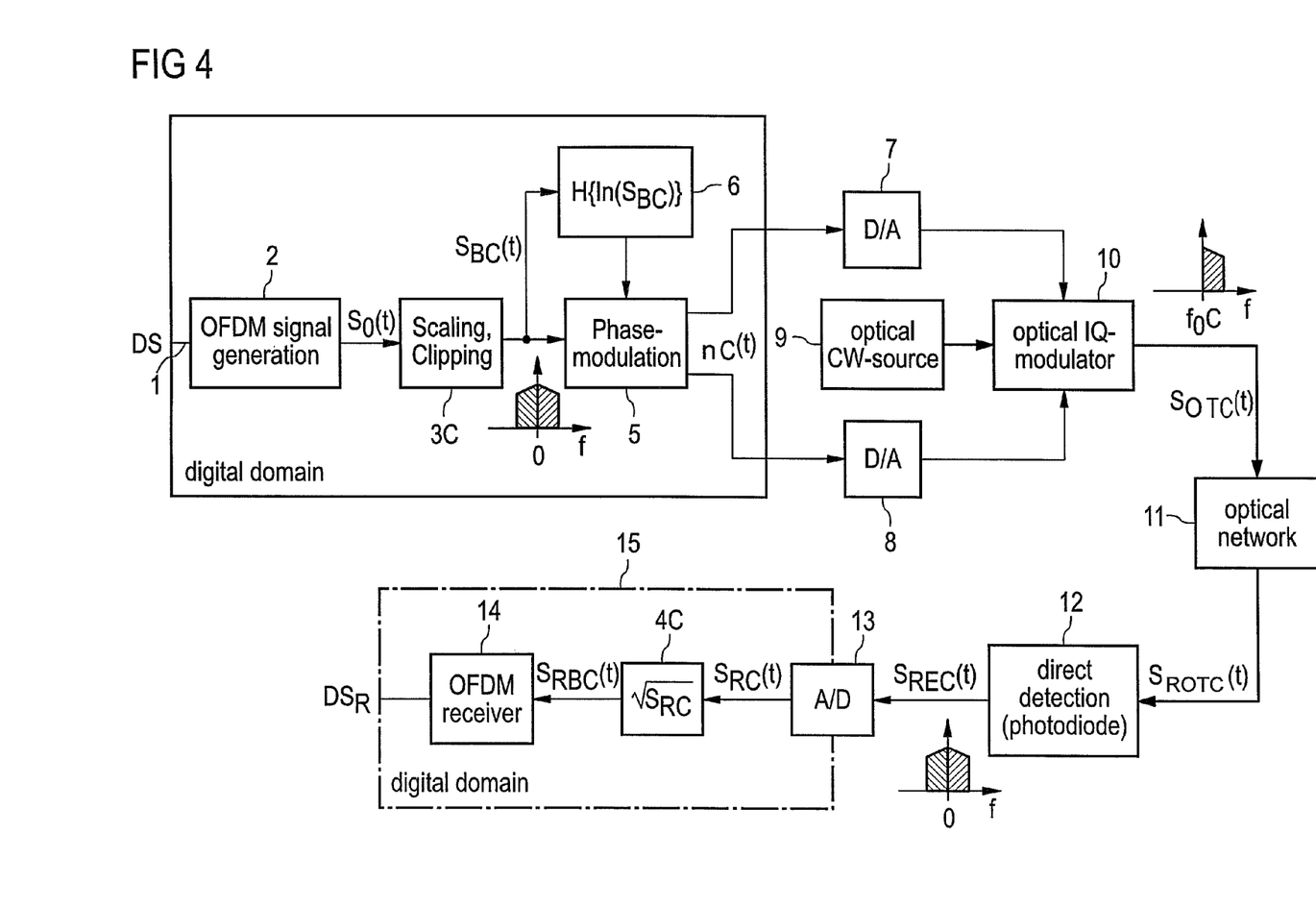

An improved second embodiment of the invention is illustrated in FIG. 4. The new transmitter (1,2,3C,5-9) and the new receiver (11-15) are similar to the transmitter and the receiver as shown in FIG. 1. But the scaling unit 3 and the square root processor 4 of the first embodiment of the transmitter are substituted by a scaling-and-clipping-unit 3C. In the second embodiment of the receiver (12,13,4C,14,15) a square-root-processor 4C is inserted between the analogue-digital converter 13 and the OFDM-receiver 14 to compensate the squaring caused by the photo diode 12. An improved method of signal processing applied in the new system avoids the generation of disturbing frequencies caused by root calculation and has a smaller carrier compared with the OFDM part of the transmission signal.

The scaling-and-clipping unit 3C limits the amplitude/power of the generated OFDM signal $S_0(t)$ to predetermined positive values. In order to enable mapping of an arbitrary real OFDM signal to the envelope of n(t), a modified limited signal $S_{1C}(t)$ analogues to the signal $S_1(t)$ to has to be built constrained to positive values, e.g.

$$S_{1C}(t)=1+S_0(t)/\max(|S_0(t)|) \quad (7)$$

All signals of the second embodiment corresponding to the signals of the first described embodiment are named "modified" signals and carry an additional index "C".

Avoiding the calculation of the square root of the OFDM signal $S_0(t)$ the modified limited signal $S_1(t)$ becomes a modified baseband signal $S_{BC}(t)$ and the equations (5) and (6) alter to $$S_{BC}(t)=S_{1C}(t) \quad \phi_C(t)=H\{\ln(S_{BC}(t))\}. \quad (8) \text{ and } (9)$$

and according equation (4) an modified modulation signal $n_C(t)$ becomes $$n_C(t)=e^{m(t)}=S_{BC}(t)e^{j\phi_C(t)} \quad (10)$$

A main problem of the CompSSB is the high carrier to signal power ratio. A possibility to reduce it is a reduction of the power range of the OFDM signal before applying the calculation of the modified baseband signal $S_{BC}(t)$ for the modulation of the optical carrier $f_{OC}$. Different methods of clipping can be applied. E.g. a constant or variable clipping factor $C_{lin}$ can be applied to $S_0(t)$ or $S_{1C}(t)$, e.g.

$$S_{0C}(t)=\frac{S_0(t)}{\sqrt{\text{mean}(|S_0(t)|^2) \cdot c_{lin}}} \quad (11)$$

$S_{OC}(t)$ is an internal calculated signal, which is not shown in the figures.

This signal is then processed according equation (7).

As mentioned before, the compensation of the optical-electrical converter 11 is performed at the receiver (12-15, 4C) by taking the square root from the values of the received digital OFDM baseband signal $S_{RB}(t)$.

Figure 5:
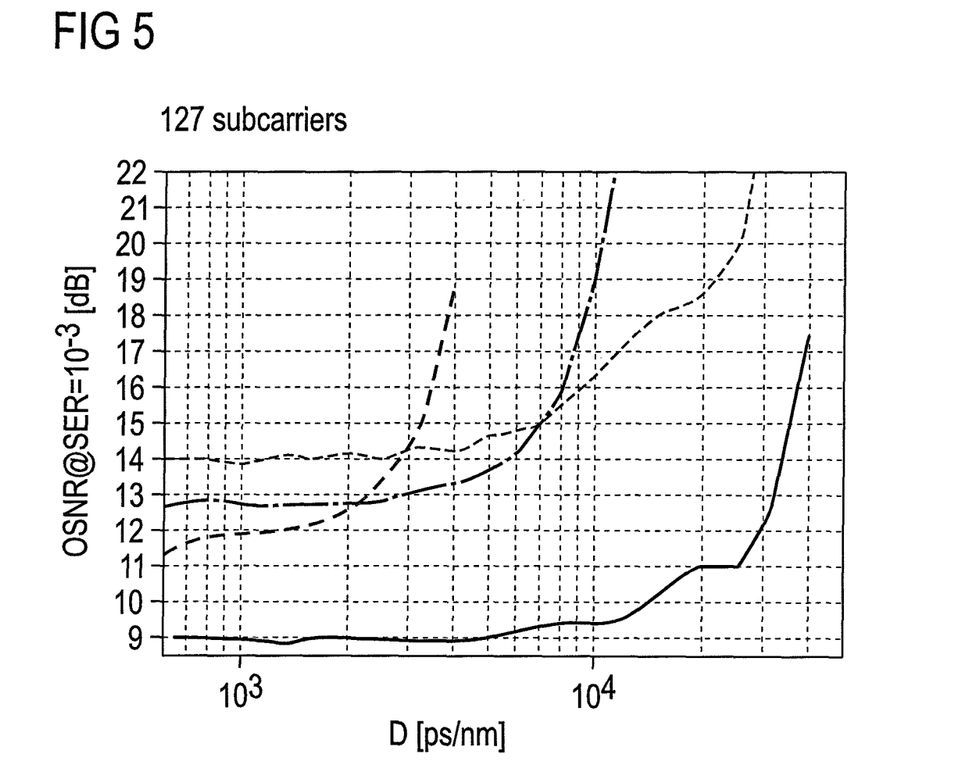
FIG. 5 shows a diagram comparing the performance of the improved Compatible OFDM SSB system with the Offset SSB OFDM system.

FIG. 5 shows a diagram illustrating the performance of the improved method, respectively system, compared with the OffsetSSB. The required OSNR for a SER=$10^{-3}$ is compared between OffsetSSB transmission (10 GHz total bandwidth) and CompSSB transmission (5 GHz total bandwidth) with different clipping factors for generation of the CompSSB signal. Results are shown for 127 subcarriers. The solid line shows the performance of the OffsetSSB, the dashed line for a small clipping factor, the dash-dotted line for medium clipping factor and the dotted line for a high clipping factor. By reducing the clipping factor, it is possible to reduce the OSNR-penalty for CompSSB compared to OffsetSSB below 3 dB.

The suggested method of using the described CompSSB in combination with compensation of the photodiode by taking the square root in the receiver allows transmission of data in half of the required bandwidth at cost of 5 dB penalty on the required OSNR compared with OffsetSSB. By applying clipping on the signal before applying the phase modulation for the CompSSB signal the OSNR penalty can be reduced to 3 dB and less on cost of the tolerance to chromatic dispersion. The dispersion tolerance compared to OffsetSSB without clipping is similar, but especially when a high number of subcarriers is used and the tolerance to chromatic dispersion is rather high, the required OSNR for CompSSB tends to increase earlier but also much slower than for OffsetSSB.

REFERENCE SIGNS 1-10 OFDM transmitter
12-15 OFDM receiver
1 Input terminal
2 OFDM signal generator
3 scaling unit
4 root processor
5 Phase modulator
6 Hilbert transformer
7 digital-analogue converter
8 digital-analogue converter
9 CW source
10 optical IQ-modulator
11 optical network
12 optical-electrical converter
13 analogue-digital converter
14 OFDM receiver
15 output terminal
3C scaling-and-clipping unit
4C root processor
DS data signal
$S_0(t)$ OFDM signal $S_1(t)$ limited OFDM signal
$S_B(t)$ (OFDM) baseband signal
$n(t)$ modulation signal
$\phi(t)$ phase modulation term
$n_R(t)$ reel component
$n_I(t)$ imaginary component
$f_{OC}$ optical carrier
$S_{OT}(t)$ optical transmission signal
$S_{OT}(t)$ received transmission signal
$S_{RE}(t)$ detected signal
$S_{RB}(t)$ received (OFDM) baseband signal
$DS_R$ received data signal
GAP gap
B bandwidth of the baseband signal $n(t)$
$S_{1C}(t)$ modified limited OFDM signal
$S_{BC}(t)$ modified (OFDM) baseband signal
$\phi_C(t)$ modified phase modulation term
$n_C(t)$ modified modulation signal
$S_{OTC}(t)$ modified optical transport signal
$S_{REC}(t)$ modified detected signal
$S_{RBC}(t)$ received modified (OFDM) baseband signal
$DS_R$ received data signal

The invention claimed is:

1. A method for transmitting an OFDM signal ($S_0(t)$) [orthogonal frequency division multiplex] in an optical network, comprising the steps of:
   generating a real valued OFDM signal ($S_0(t)$);
   deriving a limited OFDM signal ($S_1(t)$) with limited real values from said OFDM signal ($S_0(t)$);
   applying square root processing to the limited OFDM signal ($S_1(t)$) to generate an OFDM baseband signal ($S_B(t)$);
   converting the OFDM baseband signal ($S_B(t)$) into a single sideband modulation signal ($n(t)$) represented by $n(t) = S_B(t)e^{j\phi(t)}$ with $S_B(t)=\sqrt{S_1(t)}$ and $\phi(t)=H\{\ln S_B(t)\}$; and
   generating a gap free optical single sideband transmission signal ($S_{OT}(t)$) carrying information of the OFDM baseband signal ($S_B(t)$) in the power of its envelope by modulating an optical carrier ($f_{OC}(t)$) with the modulation signal $n(t)$;
   wherein:
   $S_1(t)$=the limited OFDM baseband signal,
   $\phi(t)$=a phase modulation term, and
   $H\{\ln S_B(t)\}$=Hilbert-transform of $\ln S_B(t)$.

2. A method for transmitting an OFDM signal ($S_0(t)$) in an optical network, comprising the steps of:
   generating a real valued OFDM signal ($S_0(t)$);
   deriving a modified OFDM baseband signal ($S_{BC}(t)$) with limited real values from said OFDM signal ($S_0(t)$);
   converting the modified OFDM baseband signal ($S_{BC}(t)$) into a modified single sideband modulation signal ($n_C(t)$) represented by $n_C(t)=S_{BC}(t)e^{j\phi_C(t)}$, with $S_{BC}(t)=S_{1C}(t)$ and $\phi_C(t)=H\{\ln S_{BC}(t)\}$; and
   generating a gap free modified optical single sideband transmission signal ($S_{OTC}(t)$) carrying information of the modified OFDM baseband signal ($S_{BC}(t)$) in the amplitude of its envelope by modulating an optical carrier ($f_O(t)$) with the modified single sideband modulation signal ($n_C(t)$);
   wherein:
   $S_{BC}(t)$=the modified OFDM baseband signal,
   $\phi_C(t)$=a modified phase modulation term, and
   $H\{\ln (S_{BC}(t))\}$=Hilbert-transform of $\ln (S_{BC}(t))$.

3. The method according to claim 2, wherein the deriving step includes deriving the modified OFDM baseband signal ($S_{BC}(t)$) with limited real positive values from said OFDM signal ($S_0(t)$).

4. The method according to claim 1, wherein the deriving step includes deriving the limited OFDM signal ($S_1(t)$)) with limited real positive values from said OFDM signal ($S_0(t)$).

5. The method according to claim 4, wherein the deriving step further includes:
   deriving the limited OFDM signal ($S_1(t)$) represented by $S_1(t)=1+S_0(t)/\max(|S_0(t)|)$;
   wherein $S_0(t)/\max(|S_0(t)|)$ is limited to a range of $\pm 1$ max ($|S_0(t)|$) is an absolute maximum value.

6. The method according to claims 5, wherein a single sideband modulation signal ($n(t)$) is split into a real component ($n_R$) and an imaginary component ($n_I$).

7. The method according to claim 4, further comprising the step of, at a receiver side, applying direct detection to a received transmission signal ($S_{ROT}(t)$) carrying the information in the power of the envelope.

8. A method according to claim 5, further comprising the step of, at a receiver side, applying direct detection to a received modified transmission signal ($S_{ROCT}t$)) carrying the information in the envelope, and applying root processing to a detected signal ($S_{RC}(t)$) derived from said modified transmission signal ($S_{ROTC}(t)$) to recover a modified baseband signal ($S_{RBC}(t)$).

9. The method according to claim 6, wherein:
   the limited OFDM signal ($S_1(t)$), the baseband signal ($S_B(t)$), and the modulation signal ($n(t)$) are digitally calculated at the transmitter side; and
   the received data signal ($DS_R$) is digitally calculated at the receiver side.

10. A method according to claim 9, wherein a second single sideband modulation signal and a second single sideband transmission signal is generated.

11. An apparatus for transmitting an OFDM signal ($S_0(t)$) over an optical network, comprising:
    a first digital processor configured to:
    generate a real valued OFDM signal ($S_0(t)$);
    derive a limited OFDM signal ($S_1(t)$) with limited values from said real valued OFDM signal ($S_0(t)$);
    square root process the limited OFDM signal ($S_1(t)$);
    generate an OFDM baseband signal ($S_B(t)$);
    convert the OFDM baseband signal ($S_B(t)$) into a single sideband modulation signal ($n(t)$) represented by $n(t)=S_B(t)e^{j\phi(t)}$ with $S_B(t)=\sqrt{S_1(t)}$ and $\phi=H\{\ln S_B(t)\}$; and
    split said single sideband modulation signal ($n(t)$) into a real modulation component ($n_R(t)$) and an imaginary modulation component ($n_I(t)$);
    digital-analogue-converters receiving and converting said real and imaginary modulation components ($n_R(t), n_I(t)$) into analog modulation components; and
    an IQ-modulator receiving said analog modulation components and modulating an optical carrier ($f_O(t)$) with the modulation components generating a gap free optical single sideband transmission signal ($S_{OT}(t)$)carrying information of the baseband signal ($S_B(t)$) in the power of its envelope;
    wherein:
    $S_1(t)$=the limited OFDM signal,
    $\phi(t)$=a phase modulation term, and
    H=Hilbert-transform.

12. An apparatus for transmitting an OFDM signal ($S_0(t)$) over an optical network comprising:
    a first digital processor configured to:
    generate a real valued OFDM signal ($S_0(t)$);
    derive a modified baseband signal ($S_{BC}(t)$) with limited values from said real valued OFDM signal ($S_0(t)$);

convert the modified baseband signal ($S_{BC}(t)$) into a modified single sideband modulation signal ($n_C(t)$) represented by $n_C(t)=S_{BC}(t)e^{j\phi_C(t)}$ with $S_{BC}(t)=\sqrt{S_{1C}(t)}$ and $\phi_C(t)=H\{\ln S_{BC}(t)\}$; and convert said single sideband modulation signal ($n_C(t)$) into real and imaginary modulation components ($n_R(t)$, $n_I(t)$);

digital-analogue-converters receiving and converting said real and imaginary modulation components ($n_R(t)$, $n_I(t)$) into analog modulation components; and an IQ-modulator receiving said analog modulation components and modulating an optical carrier ($f_O(t)$) with the modulation components ($n_R(t)$, $n_I(t)$) generating a gap free modified optical single sideband transmission signal ($S_{OTC}(t)$) carrying information of the modified baseband signal ($S_{BC}(t)$) in its envelope;

wherein:
$S_{1C}(t)$=the limited OFDM signal,
$\phi_C(t)$=a phase modulation term, and
H=Hilbert-transform.

13. A system for transmitting an OFDM signal using an apparatus according to claim 12, the system including an apparatus for receiving and demodulating an optical transmission signal, comprising:

an optical-electrical converter;

a second digital processor for demodulating a received OFDM baseband signal; and the apparatus for receiving and demodulating being configured to convert an optical gap free single sideband transmission signal into said OFDM baseband signal.

* * * * *